(No Model.) 3 Sheets—Sheet 2.

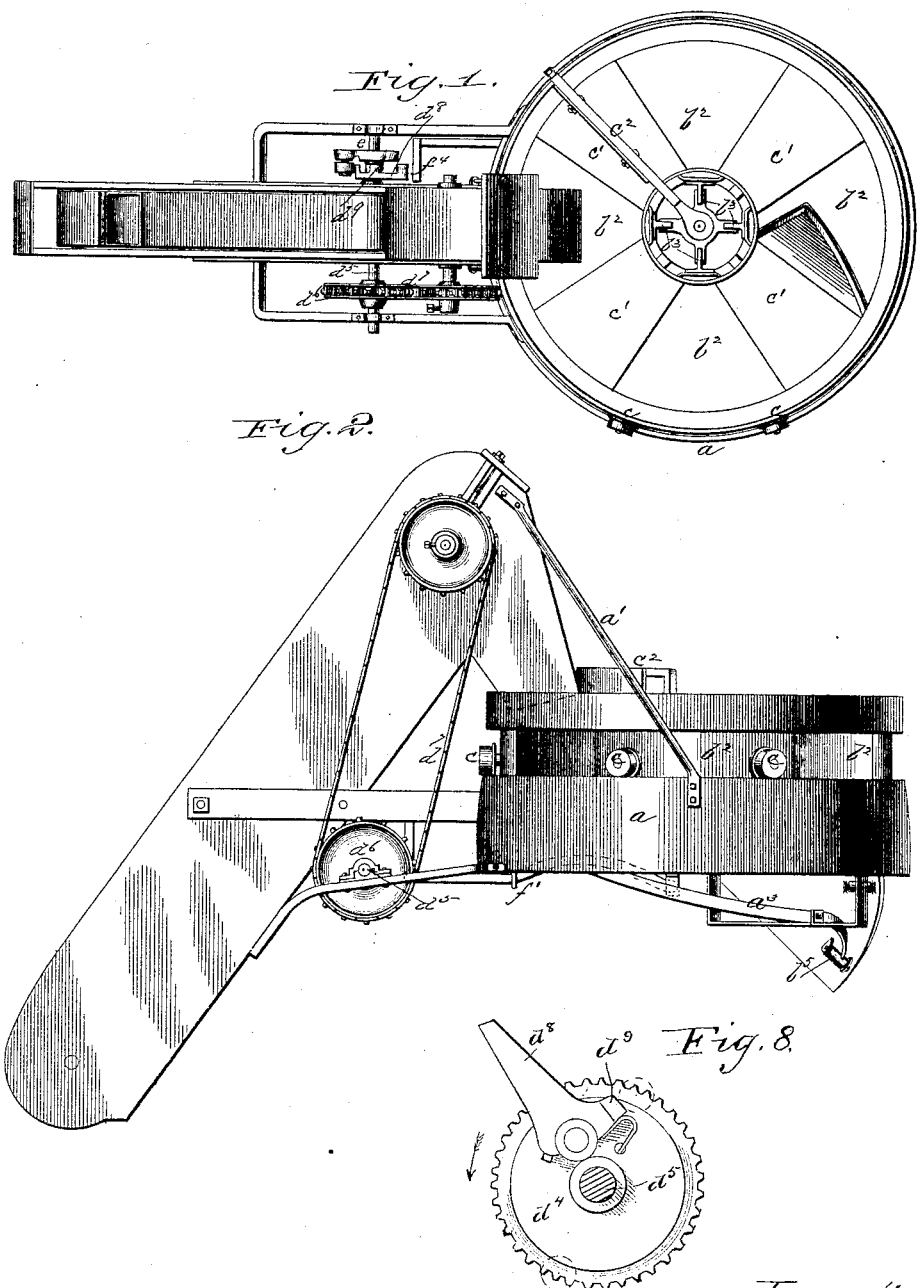
(No Model.) 3 Sheets—Sheet 1.
G. E. BAIRD.
GRAIN WEIGHING AND REGISTERING APPARATUS.
No. 349,971. Patented Sept. 28, 1886.

G. E. BAIRD.
GRAIN WEIGHING AND REGISTERING APPARATUS.

No. 349,971. Patented Sept. 28, 1886.

Witnesses.
W. Rossiter
H. C. McArthur

Inventor.
G. Edward Baird
By H. Harrison
Attys.

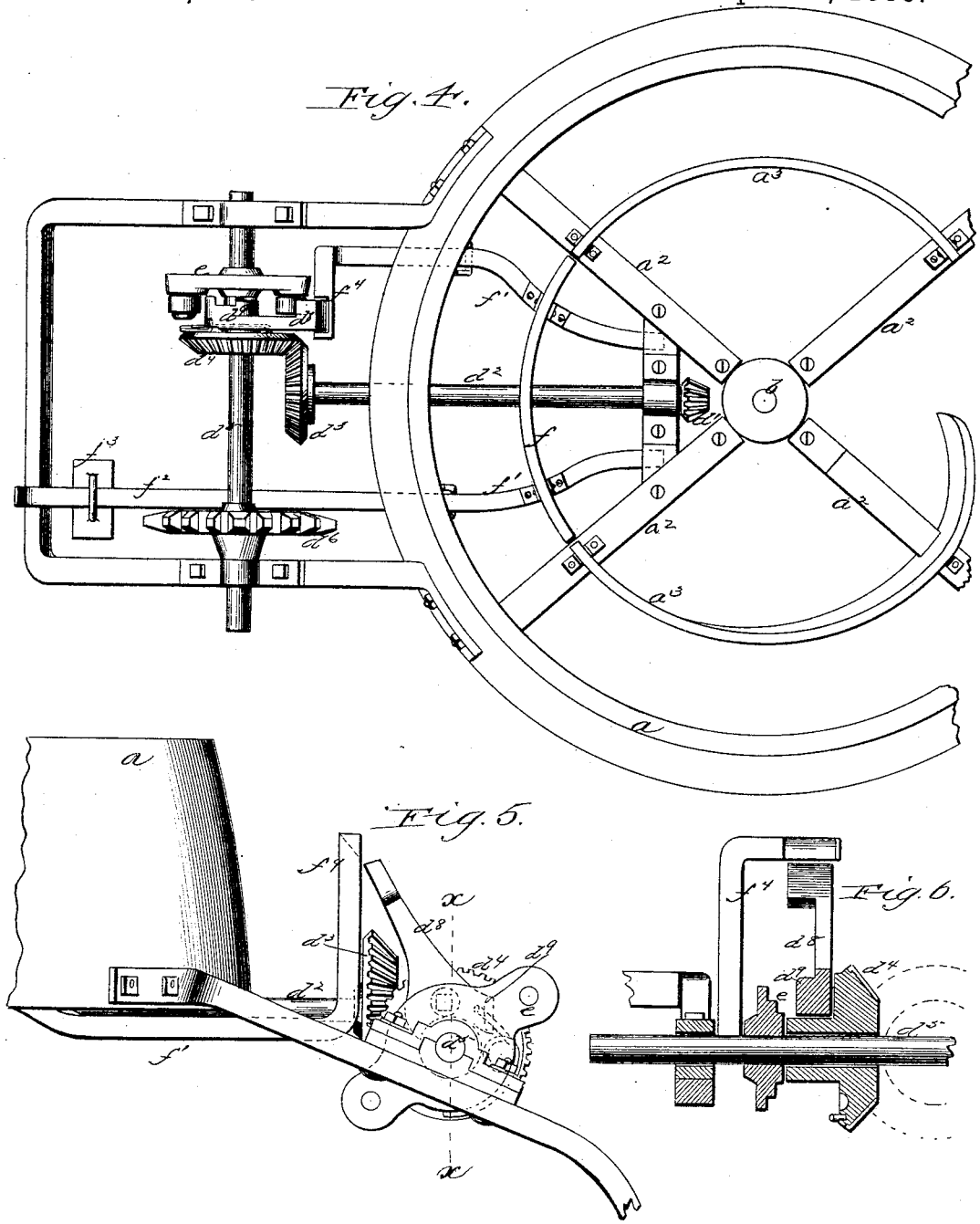

UNITED STATES PATENT OFFICE.

G. EDWARD BAIRD, OF URBANA, ILLINOIS.

GRAIN WEIGHING AND REGISTERING APPARATUS.

SPECIFICATION forming part of Letters Patent No. 349,971, dated September 28, 1886.

Application filed October 15, 1885. Serial No. 179,991. (No model.)

*To all whom it may concern:*

Be it known that I, G. EDWARD BAIRD, a citizen of the United States, residing at Urbana, in the county of Champaign and State of Illinois, have invented certain new and useful Improvements in Grain Weighing and Measuring Devices, of which the following is a specification, to wit:

This invention relates to grain weighing and measuring devices; and it consists in certain peculiarities of the construction and arrangement of the same, substantially as will be hereinafter more fully described and claimed.

In order to enable others skilled in the art to which my invention pertains to make and use the same, I will now proceed to describe its construction and operation, referring to the accompanying drawings, in which—

Figure 3:
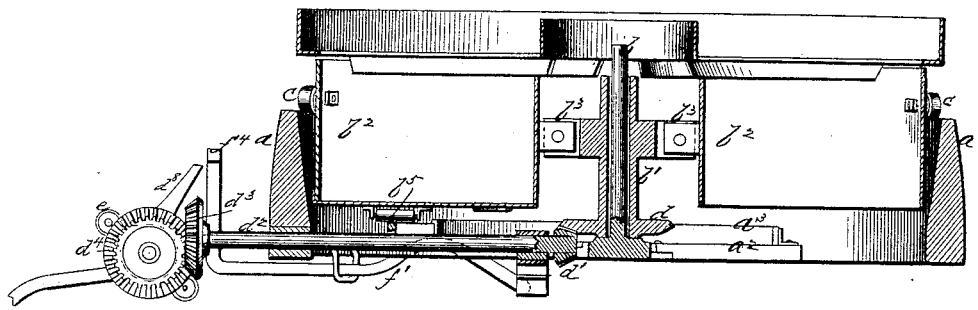
Figure 7:
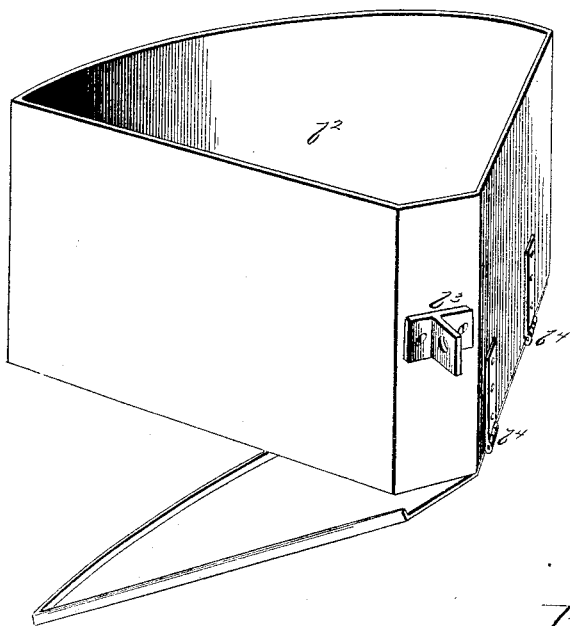

Figure 1 is a top plan view, Fig. 2 a side elevation, and Fig. 3 a central vertical section, of my invention applied to the elevator of a thrashing-machine. Fig. 4 is a plan view of the supporting-frame of the measures. Figs. 5 and 6 are detail views of the clutch which automatically operates the grain-receptacles; and Fig. 7 is a perspective view of one of these receptacles. Fig. 8 is a view of the dog which operates the measure-operating devices, and the loose gear on which it is carried.

The object of this device is to measure grain automatically, and I have herein shown it as attached to the elevator of a thrashing-machine.

$a$ represents a circular supporting-frame, the upper edge of which forms a track on which the grain-receptacles rest. This frame $a$ is hung, by suitable braces, $a'$, to the upper end of the elevator-case, and in the lower side of the frame are suitable cross-braces, $a^2$, on which is secured a curved sectional track, $a^3$. This track is arranged with one end dropped to act as a cam, as in Figs. 2 and 4, and the middle part of it is independent of the rest, and is carried on the scale-beam, as shown. The braces $a^2$ are at their center provided with a vertical spindle, $b$, on which is a sleeve, $b'$, and arranged within the circular main frame are a series of two or more grain-receptacles, $b^2$, each of which is independent of the others, and is hinged to the sleeve at $b^3$, so as to have a slight rising and falling motion. The bottoms of these receptacles are hinged on one side, as at $b^4$, and are supported in position by the semicircular cam-track $a^3$, each bottom being provided with a small roller, $b^5$, which rides upon said track. The outer ends of the hinged receptacles are provided with rollers $c$, which are supported and travel on the edge of the main frame.

The grain-receptacles are connected at their upper edges by flat plates $c'$, which prevent any grain from falling between them, and across one side from the center to the edge of the main frame is a scraper, $c^2$, which sweeps off any grain falling on these plates and prevents waste. The loose sleeve $b'$ is on its under side provided with a bevel-gear, $d$, which receives motion from a pinion, $d'$, on a shaft, $d^2$, journaled on the main frame, and extending beyond one side of the same. The outer end of this shaft has also a bevel-gear, $d^3$, meshing with a similar one, $d^4$, loose on a short shaft, $d^5$, as in Fig. 4. This shaft is provided with a sprocket-wheel, $d^6$, on one end, which is driven by a chain belt, $d^7$, connecting it with a similar wheel on the upper elevator-shaft. On the outer side of the loose gear $d^4$ is pivoted a dog, $d^8$, which is provided with a spring on its pivot or hub to hold it down, and is also formed with a shoulder, $d^9$, against which strikes a dog or arm, $e$, on the shaft. The central portion, $f$, of the cam-track $a^3$ is carried on a frame, $f'$, hinged on the main frame, and one end of this frame is extended to form a scale-beam, $f^2$, on which is a weight, $f^3$, adjustable in the usual manner, and the other end of said frame is bent up to form a stop, $f^4$, against which the spring-dog $d^8$ is caught and held.

In use one of the hinged grain-receptacles is supported upon the scale beam or frame $f'$, which is by the weight lifted till the receptacle is entirely supported thereon, and does not rest upon the circular main frame. The receptacle is then just under the discharge end of the elevator, and receives the grain therefrom. The elevator is in constant motion, and when the proper amount of grain is discharged its weight overbalances the scale and the inner end of the scale-frame and the loaded receptacle falls slightly. This lifts the arm $f^4$ from in front of the spring-dog $d^8$, and the arm or dog $e$ then contacts therewith, and by the intermediate connection turns the sleeve and series of receptacles to remove the filled box and present an empty one for use, the grain which falls on the plate $c'$ being swept off into the empty box by the scraper.

By reference to the drawings in Fig. 8 it will be seen that the dog $d^8$ is pivoted upon and carried by the loose gear $d^4$, and its spring holds it normally in the position seen in this figure, with its outer end dropped and its shoulder $d^9$ lifted, so as to be engaged by the rollers or pins on the constantly-revolving arm $e$. This carries the pinion around and moves forward the grain-receptacles; but when an empty receptacle is carried over the scale-beam the latter falls, and its stop-arm $f^4$ at once drops from the position seen in Figs. 5 and 6 and engages the end of the dog $d^8$ as it arrives at this point. This dog is thus lifted and its shoulder depressed to allow the revolving arm $e$ to pass freely by, and the receptacles are thus stationary till the proper weight has again operated the stop $f^4$ and allowed the clutch dogs or arms to engage, as before described, and the operation is thus automatically repeated. A wagon or any receptacle into which the grain is to be placed is drawn up under the device, and as the filled boxes are passed around and arrive over the break in the semicircular track the hinged bottom is allowed to drop and the grain falls into the wagon. As the receptacle is again moved forward its bottom rides upon the cam-track till closed, and it is again ready for use. As many receptacles are placed in the series as may be desired; but I have here shown four. They may be of any size, though I prefer to use them of such size as to contain an exact bushel, and the scale-weight is then set at this weight. It will thus be seen that the grain is either measured by weight or quantity, as the bushel-measures are only filled level full, and the surplus, if any, scraped off by the scraper. Any suitable clutch device may be substituted for the one herein shown to start and stop the revolving measures, and it will be obvious that this device is of equal use in measuring any material which is to be put up in boxes, bags, &c., of a given size or weight.

I shall attach an automatic register to one side of the machine to register the number of bushels weighed; but as many such are well known, and suitable for this purpose, I have not deemed it necessary to show it in this case, and the grain upon its discharge is directed either into a wagon, a bin, or any place desired.

Having thus fully described my invention, what I claim as new, and desire to secure by Letters Patent, is—

1. In a grain-measure, the combination, with a circular supporting-frame provided with a circular track, having one end bent at an incline, and a central pivotal standard, of a series of receptacles hinged to a sleeve on said standard and having hinged bottoms resting on the segmental track, said receptacles being at the outer ends provided with rollers running on the edge of the main frame, substantially as and for the purpose set forth.

2. In a grain-measure, a series of revolving receptacles, each having a vertical play independent of the others, and a scale beam or frame over which these receptacles are drawn, and on which they rest while being filled, in combination with means, substantially as described, for turning the receptacles, and a clutch for connecting and disconnecting this mechanism with the driving-shaft, said clutch being automatically operated by connection with and the movement of the scale-beam, substantially as and for the purpose set forth.

3. In a grain-measure, the combination of the independent rotating receptacles, the main frame on which they are moved provided with the segmental track for supporting their hinged bottoms, a scraper under which the receptacles are passed, a scale beam or frame on which they successively rest, and provided with a stop-arm, a main driving-shaft provided with a loose wheel, and a clutch contacting with the stop-arm, and an intermediate mechanism between said clutch and loose wheel and the rotating receptacles, all constructed and arranged to hold the receptacles stationary on the scale while filling, and to automatically move them forward and discharge them when filled, substantially as shown and described.

In testimony whereof I affix my signature in presence of two witnesses.

G. EDWARD BAIRD.

Witnesses:
 W. C. McArthur,
 W. S. McArthur.